March 11, 1930.  A. J. MICHELIN  1,750,483
VEHICLE WHEEL
Filed April 10, 1929
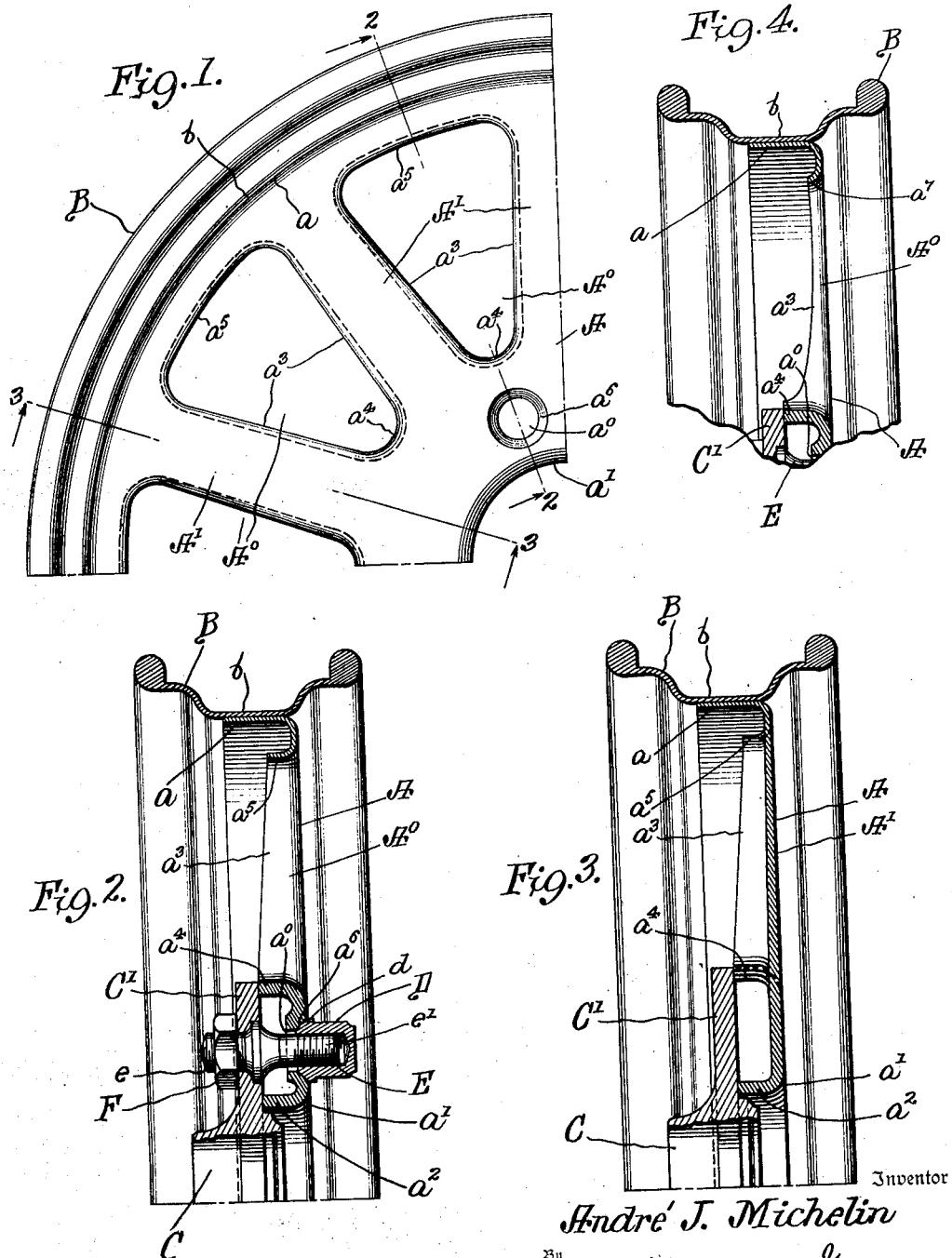
Inventor
André J. Michelin
By Wilkinson & Giusta
Attorneys.

Patented Mar. 11, 1930

1,750,483

UNITED STATES PATENT OFFICE

ANDRÉ JULES MICHELIN, OF PARIS, FRANCE, ASSIGNOR TO MICHELIN ET CIE., OF CLERMONT-FERRAND, FRANCE, A CORPORATION OF FRANCE

VEHICLE WHEEL

Application filed April 10, 1929, Serial No. 354,008, and in France November 19, 1928.

My present invention relates to improvements in vehicle wheels, and more especially in vehicle wheels adapted for use with pneumatic, rubber, or other resilient tires such as are used, for instance, on automobiles, auto trucks, and the like.

The invention consists primarily in providing a wheel with a detachable body portion adapted to be itself attached to the hub, and to which the rim is secured as by welding, rivets, or in any other convenient way, the resilient tires being mounted on the rim.

My invention is especially intended as an improvement on the construction shown in my U. S. Patent No. 1,376,390, granted April 26, 1921, and entitled Improvements in demountable wheels. In this patent, the wheel body or web plate, as it is therein called, is provided with an outer flange adapted to be secured to the rim, and with an inner flange adapted to bear directly against the flange carried by the wheel hub. The fastening bolts pass through said hub flange and freely through bolt holes in an annular hollow rib provided on the web plate, which rib is provided with concave sockets adapted to receive convex nuts mounted on the fastening bolts, the web plate being made of resilient metal such as pressed steel. According to my present invention, instead of the wheel body being in the form of a disk, it is provided with a series of elongated radial perforations, the metal adjacent said perforations being bent inwards to form a stiffening rib, and these stiffening ribs projecting inwardly towards the center of the wheel a sufficient distance to engage the face of the hub flange.

By this construction, the hollow annular rib of the patent aforesaid is dispensed with, and a firmer engagement is secured between the wheel body and the hub, and the stiffening ribs render it possible to provide a light and strong wheel body which may be made wholly of compressed metal, and which is formed with a spoke construction with apertures between said spokes, whereby the benefits of the spoke construction and the pressed steel body are secured.

My invention will be more clearly understood after reference to the accompanying drawings, in which Figure 1 is a side elevation of the part of the wheel body and rim attached thereto, as detached from the hub, Figure 2 shows a section along the line 2—2 of Figure 1, and looking in the direction of the arrows, part of the hub being shown in section, and one of the fastening bolts being shown in elevation, Figure 3 shows a section along the line 3—3 of Figure 1, and looking in the direction of the arrows, part of the hub being shown, and Figure 4 shows a modification, in which the stiffening rib surrounding the perforations in the wheel body is tapered outward, as shown.

A represents the wheel body which is preferably made of pressed metal such as steel, and is preferably tapered in thickness outwards, as shown most clearly in Figure 3. The outer portion of this wheel body may be provided with an annular flange $a$ secured to the bottom $b$ of the rim B as by welding, rivets, or in any other convenient way. This rim may be of any convenient or well-known construction and does not of itself constitute a part of my present invention.

The inner and thicker portion of the wheel body is bent over at $a'$ to form an annular rib $a^2$ adapted to bear directly against the flange or ring $C'$ on the hub C. This hub flange may be integral with or attached to the hub in any convenient way. The wheel body is provided with a series of elongated radial perforations $A^0$ separated by radial ribs $A'$. The metal of the rib adjacent to these perforations is bent over to form stiffening ribs $a^3$, the inner ends of which ribs $a^4$ bear against the hub flange $C'$. These stiffening ribs $a^3$ may be reduced in thickness outwardly, as shown at $a^5$ in Figures 1, 2 and 3, or at $a^7$ in Figure 4.

Intermediate of the bearing surfaces $a^4$ and $a^2$ the wheel body is provided with bolt holes $a^0$ through which the fastening bolts pass freely, as will be hereinafter described. These bolt holes are preferably provided with convex or tapered sockets $a^6$ to receive the bosses $d$ of the fastening nuts D, as shown in Figure 2. The bolts E are secured to the hub flange C' in any convenient way, as by the nuts F engaging the screw threads $e$, while the said bolts carry on the opposite end screw threads $e'$ which engage internal screw threads in the nuts D. I have shown only one of such fastening bolts and nuts, but obviously, the requisite number for fastening the wheel body to the hub would be provided, and it will be sufficient to illustrate and describe only one of such fastening means, and this I have done in connection with Figures 1 and 2.

It will be seen that when the bolts E are in place, as shown in Figure 2, and the nuts D screwed down tight, the resilience of the metal of the wheel body between the bearings $a^2$ and $a^4$ will tend to hold the nuts firmly in engagement, and that the nuts will automatically tend to set up on the bolts if they be made right handed with right hand wheels, and left handed with left hand wheels, as described in my Patents Nos. 1,635,894 and 1,635,895, both granted July 12, 1927 and both entitled Improvements in vehicle wheels. It will be seen that with the herein described construction, the outer side of the wheel may be made of graceful spoke construction with a plane outer face, while the inner edges of the stiffening ribs may be next to the vehicle body.

The wheel body may be flat, as shown, or dished, as shown in my patent aforesaid.

The amount of metal turned in to form the stiffening ribs may be varied at will, provided the inner edge of the stiffening rib is of sufficient depth that the bearing surface $a^4$ will bear properly against the hub flange C'.

While a more symmetrical spoke construction may be effected by having the radial perforations $A^0$ substantially V shaped, as shown in Figure 1, obviously any other suitable elongated construction may be used for this purpose provided the stiffening ribs $a^3$ are provided at their inner portions with suitable bearing surfaces $a^4$ to engage the hub flange C'.

In practice, the rim, bearing the tire, with the wheel body as described would constitute a demountable wheel which could be attached to or removed from the hub by means of fastening devices, such as are shown in Figure 2.

I do not mean to limit the invention, however, to such special fastening devices, as others well-known in the art may be adapted.

My herein described construction is a simple and attractive wheel body which may be securely attached to the hub flange and released therefrom, as desired.

The wheel body herein shown may be constructed of pressed steel, or other suitable metal, and shaped and pressed with very little machining.

While I have described the invention in its preferred form, it is obvious that various changes might be made in the construction, combination and arrangement of parts, which could be made and could be used without departing from the spirit of my invention, and I do not mean to limit the invention to such details, except as particularly pointed out in the claims.

Having thus described my invention, what I claim and desire to secure by Letters Patent of the United States is:—

1. In a wheel, the combination with a hub provided with an annular flange projecting therefrom, of a wheel body, provided with an axially disposed annular rib on the inner edge thereof adapted to bear against said flange, said wheel body being also provided with axially disposed perforations, the parts of the wheel body adjacent said perforations being bent over to form stiffening ribs, the inner portions of said ribs bearing against said hub flange, with fastening bolts passing through said wheel body and said hub flange intermediate of the points of engagement of said wheel body ribs and said hub flange, said bolts holding said wheel body in firm engagement with said hub flange.

2. In a wheel, the combination with a hub, provided with an annular flange projecting therefrom, of a wheel body, provided with an axially disposed annular rib on the inner edge thereof adapted to bear against said flange, said wheel body being also provided with axially disposed perforations, the parts of the wheel body adjacent said perforations being bent over to form stiffening ribs, the inner portions of said ribs bearing against said hub flange, said wheel body being provided with bolt holes, and concave sockets surrounding said holes, intermediate of the points of engagement of said wheel body ribs and said hub flange, screw bolts passing freely through said bolt holes and convex nuts screwed on said bolts and engaging said concave sockets.

ANDRÉ JULES MICHELIN.